United States Patent [19]

Swars

[11] Patent Number: 4,867,004
[45] Date of Patent: Sep. 19, 1989

[54] SMALL-DIAMETER AND LONG-LENGTH EXPANSION SENSOR

[75] Inventor: Helmut Swars, Bergisch Gladbach, Fed. Rep. of Germany

[73] Assignee: Interatom GmbH, Bergisch Gladbach, Fed. Rep. of Germany

[21] Appl. No.: 196,149

[22] Filed: May 19, 1988

[30] Foreign Application Priority Data

May 25, 1987 [DE] Fed. Rep. of Germany ....... 3717517

[51] Int. Cl.$^4$ ................... F16H 53/00; B23P 11/02
[52] U.S. Cl. ...................................... 74/567; 29/523; 29/156.4 R
[58] Field of Search ................ 74/567; 29/523, 421.1, 29/156.4 R, 522.1

[56] References Cited

U.S. PATENT DOCUMENTS

| | | | |
|---|---|---|---|
| 3,310,972 | 3/1967 | Erlandson et al. | 72/55 |
| 4,368,571 | 1/1983 | Cooper | 29/421.1 |
| 4,420,867 | 12/1983 | Busse | 29/421.1 |
| 4,575,913 | 3/1986 | Sugiuchi et al. | 74/567 X |
| 4,597,365 | 7/1986 | Madaffer | 74/567 |
| 4,609,317 | 9/1986 | Dixon et al. | 29/523 X |
| 4,660,263 | 4/1987 | Suzuki | 74/567 X |
| 4,662,046 | 5/1987 | Stephan | 29/156.4 R |
| 4,750,250 | 6/1988 | Maus et al. | 29/421.1 X |
| 4,781,076 | 11/1988 | Hartnett et al. | 74/567 |
| 4,782,569 | 11/1988 | Wood | 29/156.4 R |
| 4,790,733 | 12/1988 | Vaccaro | 29/156.4 R X |

FOREIGN PATENT DOCUMENTS

| | | | |
|---|---|---|---|
| 0146316 | 6/1985 | European Pat. Off. | 29/52.3 |
| 0213529 | 3/1987 | European Pat. Off. | |
| 0230731 | 8/1987 | European Pat. Off. | 74/567 |
| 2922509 | 12/1980 | Fed. Rep. of Germany | |
| 3333533 | 4/1985 | Fed. Rep. of Germany | 29/523 |
| 2050207 | 1/1981 | United Kingdom | 74/567 |

Primary Examiner—Vinh Luong
Attorney, Agent, or Firm—Herbert L. Lerner; Laurence A. Greenberg

[57] ABSTRACT

A cylindrical sensor for the sectional expansion of hollow shafts by exerting fluid pressure includes a sensor body to be disposed in a hollow shaft. The sensor body has an end and includes a sensor surface having sections corresponding to sections of the hollow shaft to be expanded. The sensor body has an outer hollow cylinder with substantially radial bores formed therein. The bores discharge partly in the sections of the sensor surface and the bores have inner ends. The sensor body has an inner cylinder onto which the outer hollow cylinder is forced. The outer hollow cylinder has an inner cylindrical surface and the inner cylinder has an outer cylindrical surface. At least one of the cylindrical surfaces has at least two longitudinal grooves formed therein communicating with the inner ends of the radial bores and forming inflow lines and drain lines for pressure fluid extending from the end of the sensor body.

5 Claims, 1 Drawing Sheet

SMALL-DIAMETER AND LONG-LENGTH EXPANSION SENSOR

Background of the Invention

1. Field of the Invention

The invention relates to a cylindrical sensor for the sectional expansion of hollow shafts by exerting fluid pressure, including inflow lines and drain lines for the pressure fluid proceeding from the end of the sensor.

2. Description of the Related Art

Sensors with which tubular bodies are secured by expansion in a body surrounding them are known, for example, for tightly joining heat exchanger tubes to tube plates. German Published, Non-Prosecuted Application DE-OS No. 29 22 509 which has a corresponding united kingdom patent application number 2,050,207A published on Jan. 7,1981 discloses a method for manufacturing camshafts, in which bearing points or cam-forming sections of tubing are forced onto a hollow shaft and joined to one another by expansion of the hollow shaft. In that publication, the sections of the hollow shaft that are to be expanded are expanded in succession by means of a mechanical tool. In Published European Application No. 0 213 529, corresponding to allowed U.S. application Ser. No. 900,387, filed Aug. 26, 1986, now U.S. Pat. No. 4,750,250 issued on June 14,1988 one of the inventors of the instant application has proposed securing a number of drive elements, such as cams, gear wheels or bearing bushings in one operation by means of hydraulic expansion. This is accomplished by introducing a sensor into the hollow shaft. The sensor has a corresponding number of sections defined by seals and the sections communicate through radial bores with a supply line for the pressure fluid extending in the interior of the sensor. When this method is applied to the production of camshafts for motor vehicle engines, it has been found on one hand that the pressures to be applied are so high (on the order of magnitude of 3000 bar) that the walls of the sensor must be at least 2 mm thick, in order for them to be able to withstand the fluid pressure. On the other hand, the outside diameters of the camshafts are limited, so that considering the wall thicknesses necessary for attaining sufficient torsional strength, their inside diameter is also limited, for example to 12 mm. Taking into account the play necessary for introducing the sensor into the hollow shaft, sensor diameters of approximately 10 mm thus result, as compared with a considerably greater sensor lengths, such as 700 mm. The pressure fluid enters the sections that are not to be expanded because of slight leaks at the seals. Therefore the presence of a drain line for the pressure fluid has proved to be desirable. The inflow line and drain line (the diameter of which cannot amount to more than approximately 1 to 2 mm, considering the diameter of the sensor) are difficult to manufacture in such a long sensor body by conventional techniques, such as drilling or reaming.

Summary of the Invention

It is accordingly an object of the invention to provide a small-diameter and long-length expansion sensor, which overcomes the hereinafore-mentioned disadvantages of the heretofore-known devices of this general type, which is easily manufactured, which has at least one inflow line and one drain line for pressure fluid that can escape from suitably radial bores originating at the inflow and drain lines, into a plurality of expansion sections that are separate from one another.

With the foregoing and other objects in view there is provided, in accordance with the invention, a cylindrical sensor for the sectional expansion of hollow shafts by exerting fluid pressure, comprising a sensor body to be disposed in a hollow shaft, the sensor body having an end and including a sensor surface having sections corresponding to sections of the hollow shaft to be expanded, an outer hollow cylinder with substantially radial bores formed therein, the bores discharging partly in the sections of the sensor surface and the bores having inner ends, and an inner cylinder onto which the outer hollow cylinder is forced, the outer hollow cylinder having an inner cylindrical surface, the inner cylinder having an outer cylindrical surface, and at least one of the cylindrical surfaces having at least two longitudinal grooves formed therein communicating with the inner ends of the radial bores and forming inflow lines and drain lines for pressure fluid extending from the end of the sensor body.

Longitudinal grooves on the inside of the outer hollow cylinder or (preferably) on the inner cylinder, are easily produced by reaming or milling and are closed to form conduits for which a circular cross section is not necessary, when the two sensor parts are telescoped together.

In accordance with another feature of the invention, the outer hollow cylinder and the inner cylinder are soldered or glued to one another. This is done in order to produce a firm connection between the two sensor parts and also to seal off any microscopic gap that may remain between the.

In accordance with a concomitant feature of the invention, at least one of the cylindrical surfaces has pockets formed therein filled with solder prior to soldering or with glue prior to gluing. Pockets are recommended for the joining method described above. The pockets (which may also suitably have the form of longitudinal grooves) serve to receive a sufficient amount of soldering or gluing material, which is liquefied by heating and as a result seals off the gap between the two sensor parts while simultaneously joining these parts in a material-locking manner.

Other features which are considered as characteristic for the invention are set forth in the appended claims.

Although the invention is illustrated and described herein as embodied in a small-diameter and long-length expansion sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Description of the Preferred Embodiments

Figure 1:
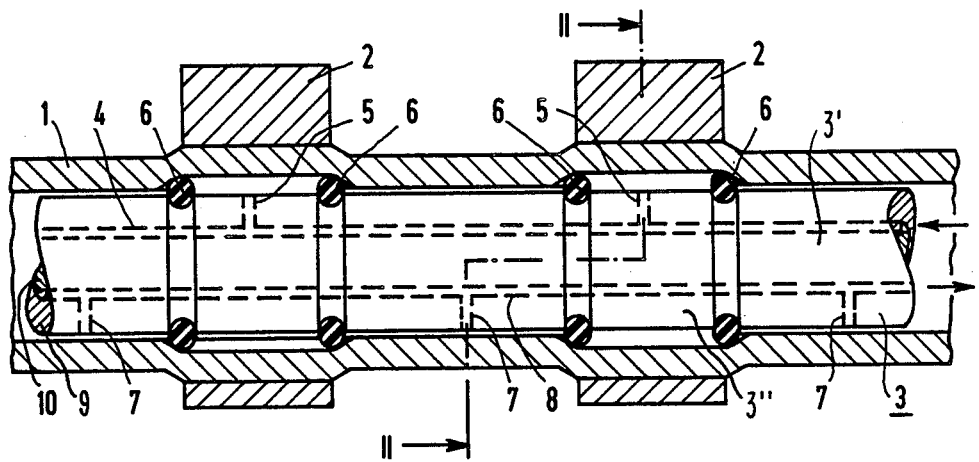
FIG. 1 is a fragmentary, diagrammatic, longitudinal axial sectional view taken along the line I—I of FIG. 2 in the direction of the arrows.
Figure 2:
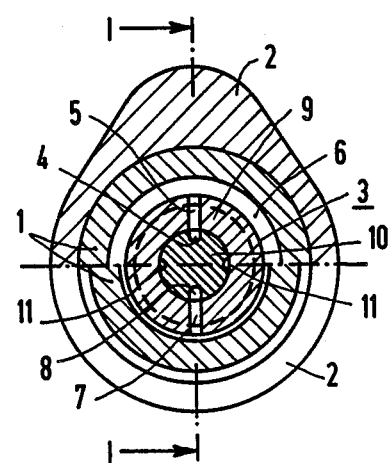
FIG. 2 is a cross-sectional view taken along the line II—II of FIG. 1 in the direction of the arrows.

Referring now to the figures of the drawings in detail, there is seen a plurality of drive elements such as cams 2 which are secured on a hollow shaft 1 by means of expansion or enlargement of sections of the shaft in one operation. This is accomplished by means of a sensor 3, which has an axial inflow line 4 originating at a non-illustrated pressure fluid source. Radial bores 5 protrude from the inflow line 4 on the outside of the sensor in sections 3', 3'', etc. of the sensor surface defined by encompassing seals 6 which in turn define the parts or sections of the hollow shaft 1 that are to be expanded. Leaks through the seals 6 into the regions between the sensor 3 and the hollow shaft 1 that are not to be expanded, are drained through further radial bores 7 that discharge in a similarly axially extending drain line 8. The sensor 3 is formed of a hollow cylindrical outer part 9 and a cylindrical inner part 10, which are suitably joined together by soldering or gluing. Preferably, the inflow line 4 and the drain line 8 are in the form of longitudinal grooves milled in the outer surface of the inner part 10. However, the grooves could be formed in the inner surface of the outer part 9 or in both surfaces. Two further grooves or pockets 11 are distributed uniformly over the periphery of the inner part 10. Prior to the forcing the outer part 9 onto the inner part 10, the grooves 11 are filled with solder or glue, which is subsequently liquefied by heating and which seals off the gaps between the two parts.

I claim:

1. Cylindrical sensor for the sectional expansion of hollow shafts by exerting fluid pressure, comprising a sensor body to be disposed in a hollow shaft, said sensor body having an end and including a sensor surface having sections corresponding to sections of the hollow shaft to be expanded, an outer hollow cylinder with substantially radial bores formed therein, said bores discharging partly in said sections of said sensor surface and said bores having inner ends, and an inner cylinder onto which said outer hollow cylinder is forced, said outer hollow cylinder having an inner cylindrical surface, said inner cylinder having an outer cylindrical surface, and at least one of said cylindrical surfaces having at least two longitudinal grooves formed therein communicating with said inner ends of said radial bores and forming inflow lines and drain lines for pressure fluid extending from said end of said sensor body.

2. Sensor according to claim 1, wherein said outer hollow cylinder and said inner cylinder are soldered to one another.

3. Sensor according to claim 1, wherein said outer hollow cylinder and said inner cylinder are glued to one another.

4. Sensor according to claim 2, wherein at least one of said cylindrical surfaces have pockets formed therein filled with solder prior to soldering.

5. Sensor according to claim 3, wherein at least one of said cylindrical surfaces have pockets formed therein filled with glue prior to gluing.

* * * * *

UNITED STATES PATENT AND TRADEMARK OFFICE
CERTIFICATE OF CORRECTION

PATENT NO. : 4,867,004

DATED : September 19, 1989

INVENTOR(S) : Helmut Swars

It is certified that error appears in the above-identified patent and that said Letters Patent is hereby corrected as shown below:

In the Title, Item (54), "SENSOR" should read "PROBE";

In the Abstract, Item (57), all occurences, namely
Lines 1, 3, 4, 6, 8, 9 and 17,
"sensor" should read "probe";

In the Specification, Column 1, In the Title,
Line 2, "SENSOR" should read "PROBE";

In Paragraph 1, Lines 1 and 4,
"sensor" should read "probe";

In Paragraph 2, Line 1,
"Sensor" should read "Probe";

In Paragraph 2, Lines 21, 22, 25, 29, 36, 37, 39, 45 and 46,
"sensor" should read "probe";

In Paragraph 3, Line 2,
"sensor" should read "probe";

Column 2,
In Paragraph 2, Lines 3, 4, 5, 6, 10 and 19,
"sensor" should read "probe";

In Paragraph 3, Line 5,
"sensor" should read "probe";

In Paragraph 4, Line 4,
"sensor" should read "probe";

In Paragraph 5, Line 10,
"sensor" should read "probe";

In Paragraph 7, Line 3,
"sensor" should read "probe";

UNITED STATES PATENT OFFICE
CERTIFICATE OF CORRECTION

PATENT NO. : 4,867,004

DATED : Sep. 19, 1989

INVENTOR(S) : Helmut Swars

It is certified that error appears in the above-identified patent and that said Letters Patent is hereby corrected as shown below:

In the Specification, Column 3,
In Paragraph 1, Lines 5, 8, 9, 13 and 16, "sensor" should read "probe";

Column 4, Claim 1, Lines 1, 3(twice), 4, 8 and 17, "sensor" should read "probe";

Column 4, Claim 2, Line 1, "Sensor" should read "Probe";

Column 4, Claim 3, Line 1, "Sensor" should read "Probe";

Column 4, Claim 4, Line 1, "Sensor" should read "Probe";

Column 4, Claim 5, Line 1, "Sensor" should read "Probe".

Signed and Sealed this

Twelfth Day of March, 1991

Attest:

HARRY F. MANBECK, JR.

*Attesting Officer*   *Commissioner of Patents and Trademarks*